(12) United States Patent
Matos et al.

(10) Patent No.: US 6,567,768 B1
(45) Date of Patent: May 20, 2003

(54) DETERMINING AN EXTENT TO WHICH AN ELECTRONIC DEVICE HAS BEEN OPERATED

(75) Inventors: Gary N. Matos, Portland, OR (US); Philip W. Martin, Gaston, OR (US); Cheryl M. Troy, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 09/607,723

(22) Filed: Jun. 30, 2000

(51) Int. Cl.7 ................................................ G06F 11/30
(52) U.S. Cl. ........................ 702/187; 702/82; 702/186
(58) Field of Search ................................ 702/186, 187, 702/82; 700/2, 95, 112, 115, 213, 228, 304; 714/47

(56) References Cited

U.S. PATENT DOCUMENTS

| | | | |
|---|---|---|---|
| 4,604,616 A | * | 8/1986 | Buchas ........................ 340/756 |
| 5,280,438 A | * | 1/1994 | Kanemaru .................. 364/561 |
| 5,522,076 A | * | 5/1996 | Dewa et al. .................... 713/2 |
| 5,673,190 A | * | 9/1997 | Kahleck et al. ................ 700/2 |
| 5,724,260 A | * | 3/1998 | Klein .......................... 364/550 |
| 5,923,870 A | * | 7/1999 | Johns et al. ................ 395/557 |

FOREIGN PATENT DOCUMENTS

| | | |
|---|---|---|
| EP | 0 623 900 A 1 | 11/1994 |
| GB | 2716637 A | 12/1986 |

* cited by examiner

Primary Examiner—John Barlow
Assistant Examiner—Stephen Cherry
(74) Attorney, Agent, or Firm—Blakely, Sokoloff, Taylor & Zafman LLP (57) ABSTRACT

A recording unit is incorporated into an electronic device to record an extent to which the electronic device is operated. In one embodiment, the recording unit is a code structure installed in a memory of the electronic device. The extent to which the electronic device has been operated can be interpreted based on information recorded on the electronic device by the recording unit. In one embodiment, the extent to which the electronic device has been operated is used to determine whether or not the electronic device is eligible for re-sale as a new product.

8 Claims, 6 Drawing Sheets

DETERMINING AN EXTENT TO WHICH AN ELECTRONIC DEVICE HAS BEEN OPERATED

FIELD OF THE INVENTION

The present invention pertains to the field of electronic devices. More particularly, this invention relates to determining to what extent a returned electronic product has been operated.

BACKGROUND

When customers return products, it usually costs businesses money. The market for used products is often very limited. So, if a business has to sell a returned product as used, the business may be lucky to sell the product for a fraction of its original price. This is especially true for technology products like personal computers, audio/video equipment, networking hardware, and other electronic devices. Nonetheless, businesses often accept returned merchandise for various reasons, including things like promoting customer good will and complying with government regulations.

The costs associated with returned products can often be greatly reduced if the returned products can be legally re-sold as new. The incentive to re-sell products as new, however, may be outweighed by other factors. For instance, government entities may impose sanctions on businesses that sell used products as new. More importantly, being publicly accused of wrongly selling used products as new can significantly damage a business's reputation. In which case, if it is not easy to tell whether or not a returned product has been used, businesses tend to err on the side of caution when it comes to re-selling returned products.

For instance, in the United States, according to the Federal Trade Commission (FTC), if a product has been demonstrated to have been used by a customer for the product's intended purpose, then the product is said to be used. In which case, products such as electronic devices are often treated as used as soon as the products have been removed from their packaging. That is, even though an electronic device may never have even been turned on, much less used for an intended purpose, the product is treated as used to ensure compliance with FTC regulations and to avoid the possibility of bad publicity. Unnecessarily treating these products as used undoubtedly costs businesses millions of dollars every year.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

As discussed more fully below, the present invention provides a way to determine the extent to which an electronic device has been operated. For instance, various embodiments of the present invention allow a business to determine whether or not a returned electronic device has been used for its intended purpose, and therefore whether or not the device can be re-sold as new. The potential cost savings as a result of the present invention are huge.

In general, embodiments of the present invention incorporate functionality into an electronic device to record the extent to which the device is operated. If the product is returned, the recorded information can be interpreted to determine whether or not the device has been used for its intended purpose.

For instance, the intended purpose of a television may be to tune an input signal and display an image based on the signal. In which case, the television could be incorporated with functionality to record when and if the television tunes an input signal and displays an image based on the signal. If the television is returned, the recorded information could be used to determine whether or not the television could be re-sold as new. The present invention can similarly be applied to a wide variety of electronic devices including, for instance, audio devices, computers, personal digital assistants, cellular devices, large and small scale networking devices, appliances, and the like. As used herein, the term electronic is intended to include, but is not limited to, a variety of digital, analog, and optical devices.

Figure 1:
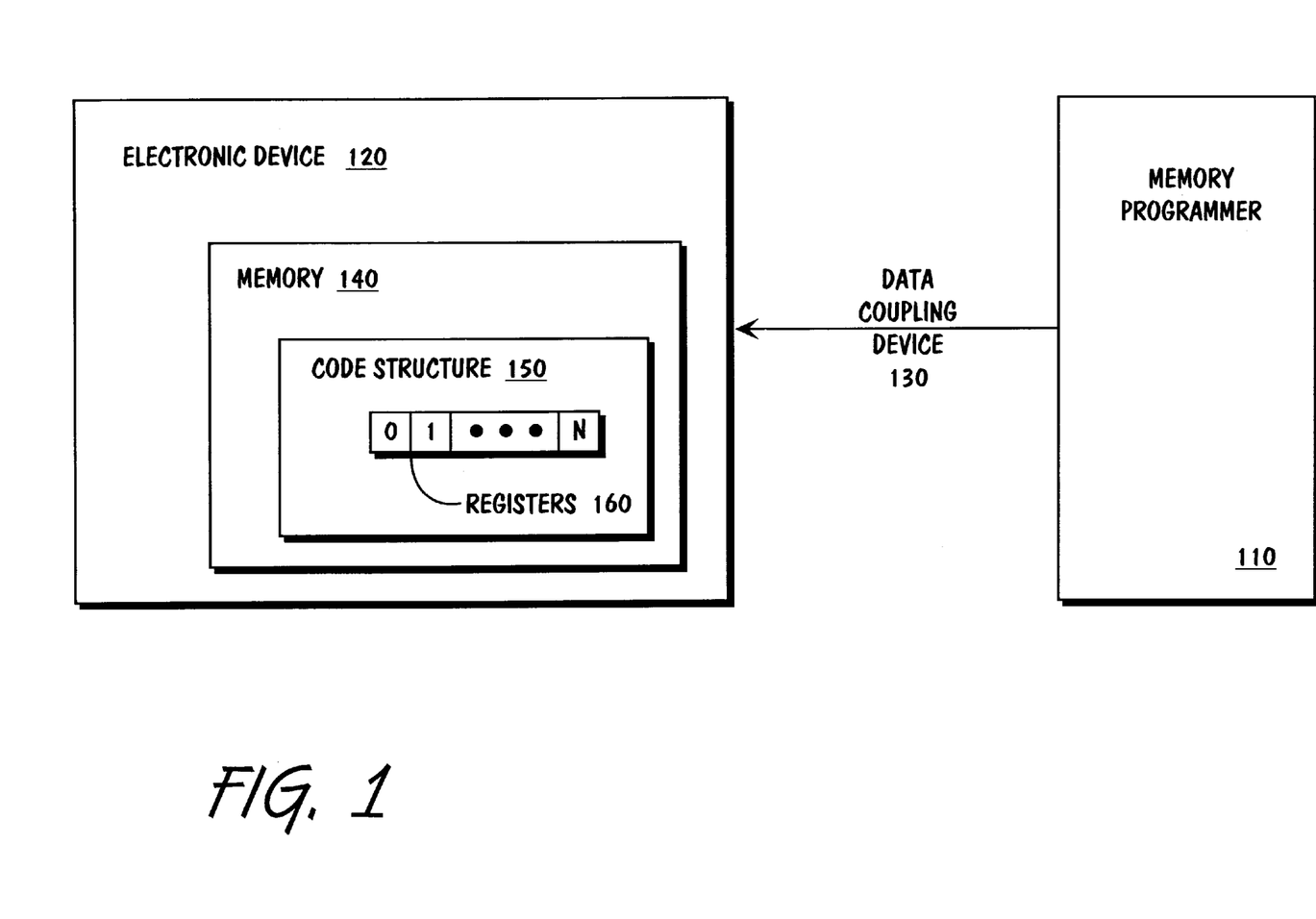
FIG. 1 illustrates one embodiment of the present invention to incorporate a recording unit.

FIG. 1 illustrates one embodiment of the present invention. An inventive memory programmer 110 couples to an electronic device 120 through data coupling device 130. Electronic device 120 includes a memory 140. Memory programmer 110 installs code structure 150 in memory 140. Code structure 150 includes a number of registers 160. The registers correspond to various levels of operation of electronic device 120. By using a number of registers, code structure 150 can, for instance, record how far along in a continuum of start-up procedures a user went before returning the device.

As an example, if electronic device 120 is a networking device, a first register may be set when the networking device is powered-on, a second register may be set when the networking device downloads software (for instance to create firmware), (not shown), from memory 140, and a third register may be set when the networking device sends or receives data. Then, assuming there is no definitive definition for the intended purpose of a networking device, a business may choose a point in the continuum of operation levels to distinguish devices eligible for re-sale from those that are not eligible for re-sale.

For instance, depending on supply and demand for the device, the business may be willing to risk re-selling devices that have not actually sent or received data based on the assertion that the intended use of a networking device is to send or receive data. Under different circumstances, the business may be less willing to accept risk, and may choose to only re-sell devices that have not been used beyond being powered-on based on the assumption the intended use for the device is something more than merely being powered-on.

In alternate embodiments, any number of approaches can be used to record the extent to which a product has been operated. For instance, a single multi-bit vector could be used in which each bit corresponds to a different level of use. In other embodiments, a hardware solution could be used. For instance, an array of resettable switches or replaceable fuses could be set or blown as different levels of use are reached.

In FIG. 1, except for the teachings of the present invention, memory programmer 110 and data coupling device 130 are intended to represent a variety of devices used to manufacture, assemble, program, initialize, install, etc., electronic devices and/or components used within electronic devices. For instance, in one embodiment, a manufacturing facility includes equipment to "burn" or program memory 140 (such as in firmware). In which case, the functionality of memory programmer 110 and data coupling device 130 could be performed by adding code structure 150 to the firmware.

Memory 140 is intended to represent a variety of non-volatile memory devices such as electrically erasable programmable read only memory (EEPROM), flash EEPROM, or a combination of different kinds of memory.

Figure 2:
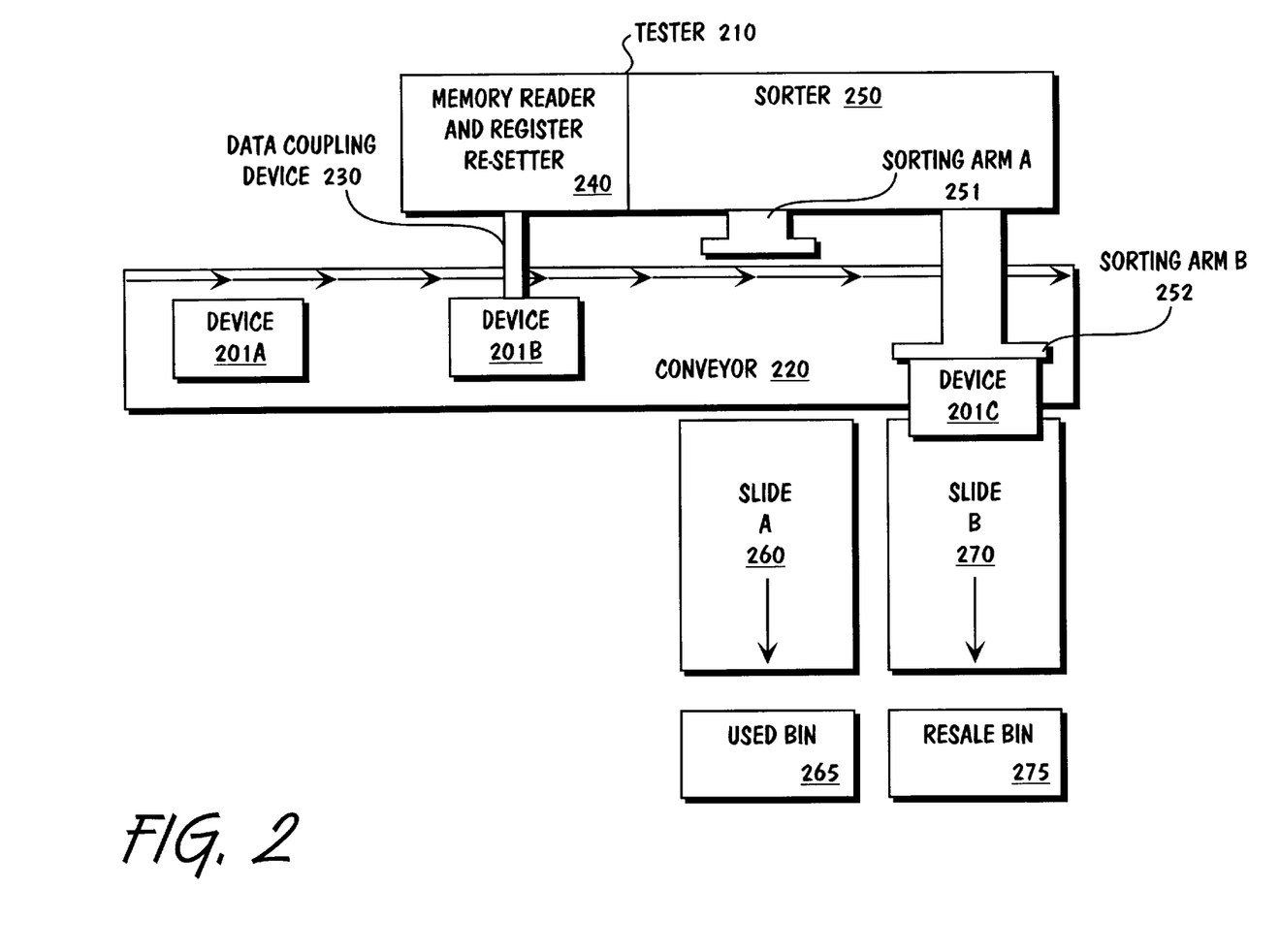
FIG. 2 illustrates one embodiment of the present invention to interpret a level of operation as recorded by the recording unit.

FIG. 2 illustrates an embodiment of the present invention for testing returned products. As with the embodiment of FIG. 1, except for the teachings of the present invention, the embodiment of FIG. 2 is intended to represent a variety of processing facilities for testing, sorting, manipulating, etc., a variety of electronic devices.

In the embodiment of FIG. 2, returned devices 201 A, B, and C move past tester 210 on conveyor 220. Tester 210 includes a data coupling device 230 that couples the tester to the devices as they move by. Memory reader 240 downloads information recorded in the memories of the devices and identifies a level of operation for each device. For instance, referring to the embodiment of FIG. 1, memory reader 240 downloads values stored in registers 160. Depending on which registers where set prior to the devices being returned, memory reader 240 can identify the extent of operation for each device.

In the illustrated embodiment, memory tester 240 also includes a register resetter to reset the registers in each memory device after the registers are read. By resetting the registers, the device is ready to be re-sold if indeed the device is determined to be eligible for re-sale. In alternate embodiments, the register re-setter may be located elsewhere in the process and/or may only reset the registers in devices that have been determined to be eligible for re-sale.

Sorter 250 sorts devices into bins 265 and 275 using sorting arms 251 and 252. Bin 265 is for used devices and bin 275 is for devices eligible for resale. Sorter 250 times the sorting arms to push devices either down slide A 260 into the bin 265 or down slide B 270 into the bin 275. In various embodiments, memory reader 240 may instruct sorter 250 as to which sorting arm to use or simply inform sorter 250 of the identified level of operation for a given device and let sorter 250 decide.

The embodiment of FIG. 2 is largely automated. Any variety of automated or manual alternatives are possible. For example, in alternate embodiments, human operator may play a larger roll. A human operator may manually attach data coupling device 230 to each electronic device 201. Then, depending on the level of operation identified by memory reader 240, the human operator may decide whether or not the device is eligible for resale and sort the device accordingly. Alternately, memory reader 240 may tell the human operate whether or not the device is eligible for resale and/or instruct the human operate how to sort the device.

Figure 3:
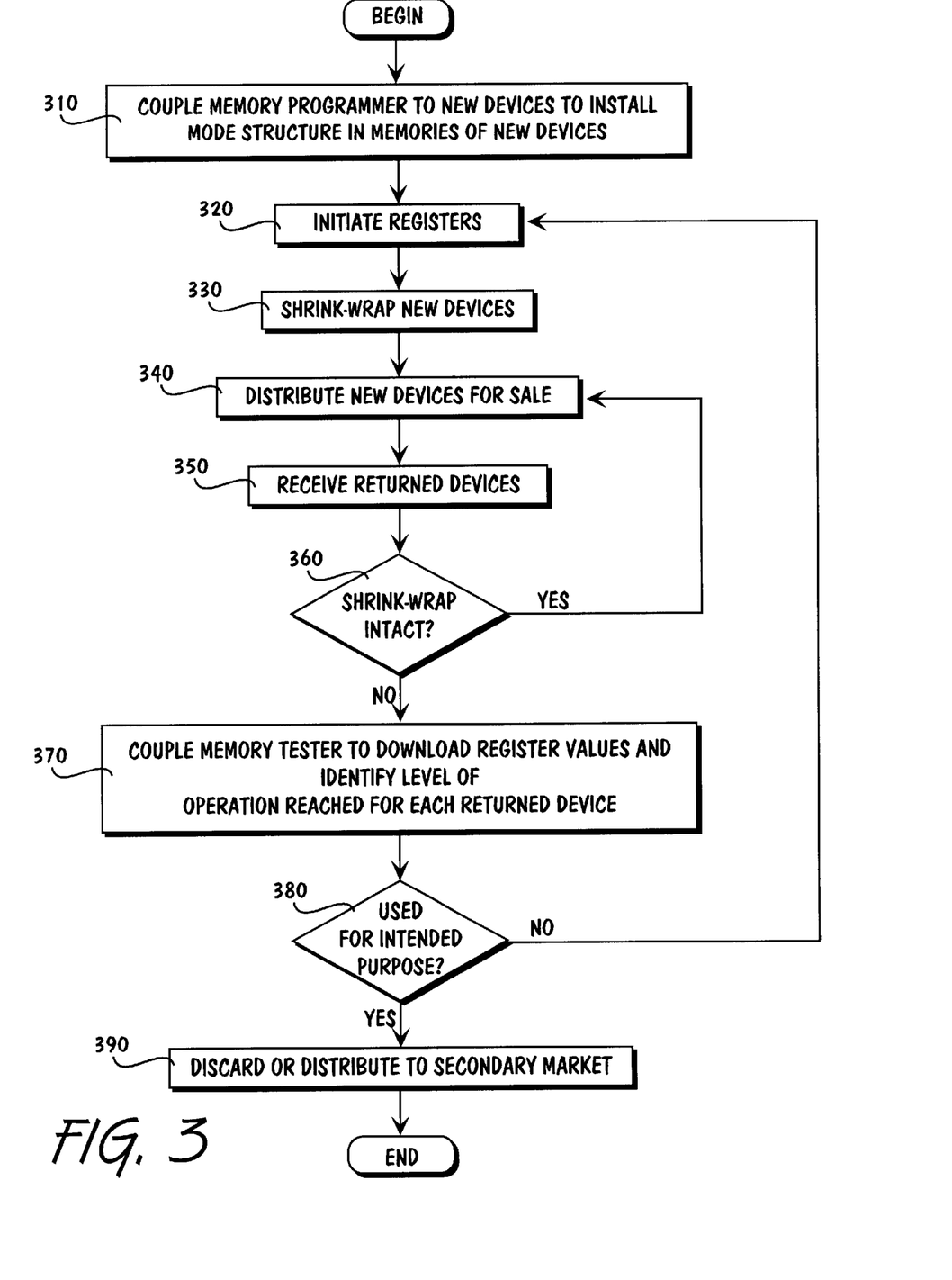
FIG. 3 demonstrates a flow for one embodiment of the present invention.

FIG. 3 demonstrates one embodiment of the present invention. In block 310, a memory programmer couples to new devices and installs a code structure in a memory of each device to record an extent of operation. In block 320, the registers in the code structures are initialized. In block 330, the devices are packaged in shrink wrap, and in block 340 the new devices are distributed for sale.

In block 350, a certain percentage of the devices are returned by customers for various reasons. In block 360, if the shrink wrap is still intact, the devices can be distributed again and sold as new in block 340. If the shrink wrap is not intact, the devices are coupled to a memory tester to download the register values and identify a level of operation reached for each device 370.

In block 380, if a returned device was not used for its intended use, as determined based on the level of operation reached, the registers in the device are initialized again in block 320, the device is re-packaged in shrink wrap in block 330, and the device is distributed for sale as new in block 330. If the returned device was used for its intended purpose, the device is either discarded or distributed to a secondary market in block 390.

Alternate embodiments may not include all of the above illustrated blocks, and may perform one or more blocks in different order. For instance, as discussed above, registers may be re-set, or initialized, for all returned devices rather than just those eligible for resale. In another embodiment, the devices may not be packaged. For instance, large appliances are often delivered without packaging or shrink wrap. Furthermore, the flow of FIG. 3 can be re-entered as new devices are manufactured and/or returned.

Figure 4:
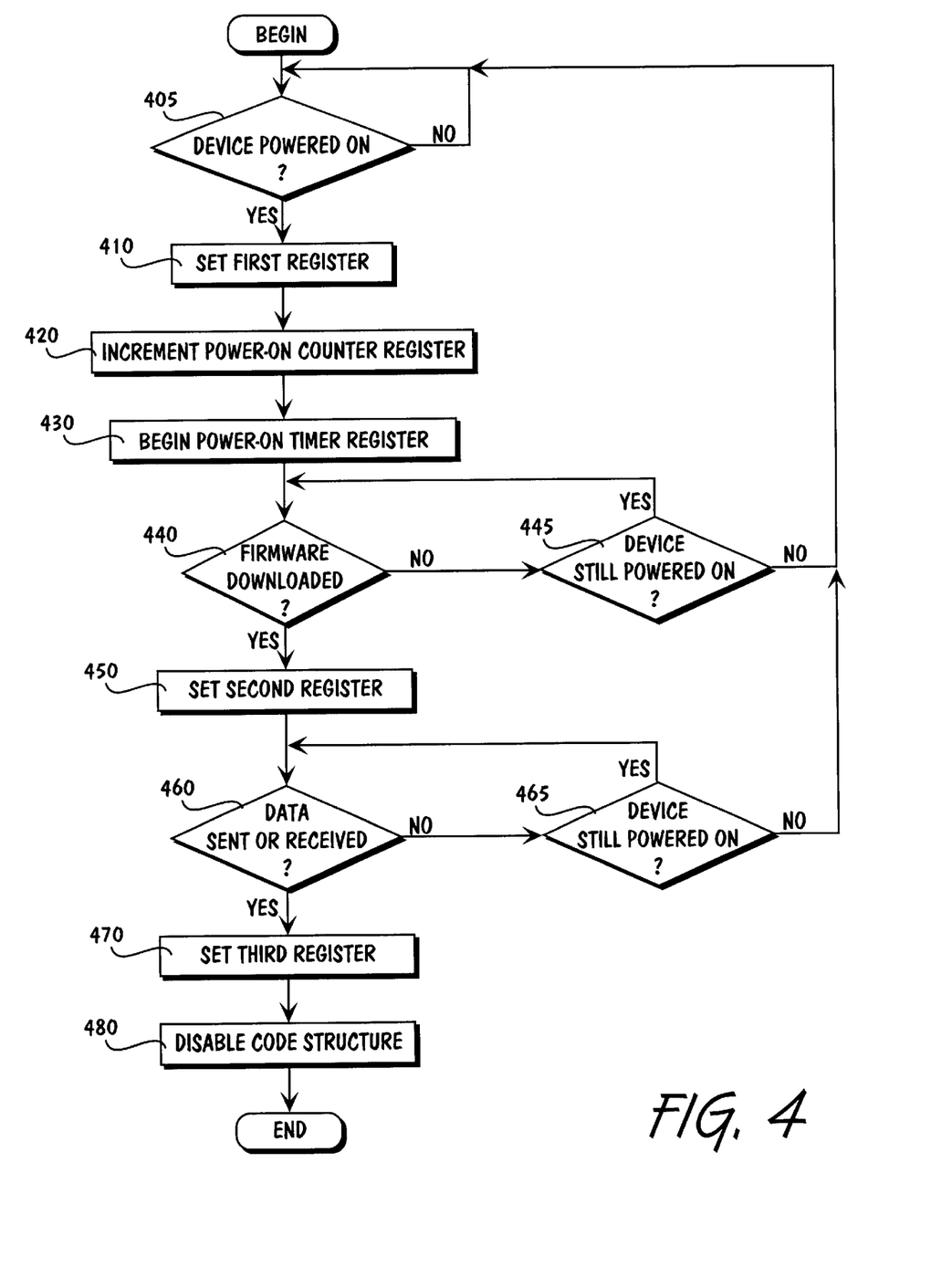
FIG. 4 demonstrates a flow for one embodiment of a code structure.

FIG. 4 demonstrates one embodiment of a code structure in an exemplary networking device as the code structure is triggered by various user and/or environmental actions. In block 405, the code structure waits for the device to be powered on. In reality, the code structure may simply be doing nothing since the device is not powered on. In any event, when the device is powered on, in block 410 the code structure sets a first register.

In block 420, the code structure increments a counter that keeps tract of the number of times the device has been powered on. The value of the counter is stored in a register. In block 430, the code structure starts a timer that keeps tract of how long the device has been powered on. The value of the time is also stored in a register. The number of times and duration that a device has been powered on can be factors used in determining whether or not a device is eligible for resale. For instance, even if the device was only powered on and not otherwise used, if the device were powered on a certain number of times or for a certain one-time duration or accumulated duration, then the device may be considered used. Registers can be used throughout the illustrated flow to store a variety of additional operation-level factors such as maximum operating temperature, maximum moisture content, etc.

In block 440, the code structure waits for software to be downloaded (for firmware). While the code structure waits for software to be downloaded, if the device is powered down in block 445, the code structure starts over at block 405. If the power comes back on, in the illustrated embodiment, the first register is set again in block 410. In alternate embodiments, block 410 may be skipped because the first register has previously been set. In either case, the first register value remains the same, indicating that the device has been powered on at least once. In block 420, the powered-on counter is incremented and the timer resumes counting in block 430.

The first register and the powered-on counter may be redundant. For instance, the powered-on counter can be used to determine whether or not the device has ever been powered on. In which case, the first register can be eliminated. In various other embodiments however, having both registers or only the first register may be useful or provide added flexibility. For instance, the first register may be a single bit register and the powered-on counter may require several bits. In which case, depending on available memory, bus bandwidth, and a variety of other factors using one, the other, or both registers may be appropriate or beneficial.

Returning to FIG. 4, if in block 440, software is downloaded (for firmware), the code structure sets a second register in block 450. In block 460, the code structure waits again. This time the code structure waits for data to be sent or received. While the code structure waits, if the device is powered down 465, the code structure will return to block 405 and begin again. In alternate embodiments, once block 460 has been reached, the code structure may skip one or more blocks between block 405 and block 460 as soon as the device is powered back on rather than again setting the first and second registers and determining whether or not software has been download. For instance, the code structure may skip block 410, perform blocks 420 and 430, and skip blocks 440 and 450 to return more directly to block 460.

In any event, in block 460, when and if data is sent or received, a third register is set in block 470 to indicate that the highest level of operation has been reached. And, since the highest level of operation for the illustrated embodiment has been reached, the code structure disables itself in block 480 based on the assumption that, at this point in the flow, the device has been used for its intended purpose and cannot be eligible for re-sale as new. In alternate embodiments where there is no clear maximum level of operation, the code structure may continue to gather data, such as the number of times the device is powered on, the duration of use, etc., until the storage capacity of the registers is exceeded or until some other terminating event.

Figure 5:
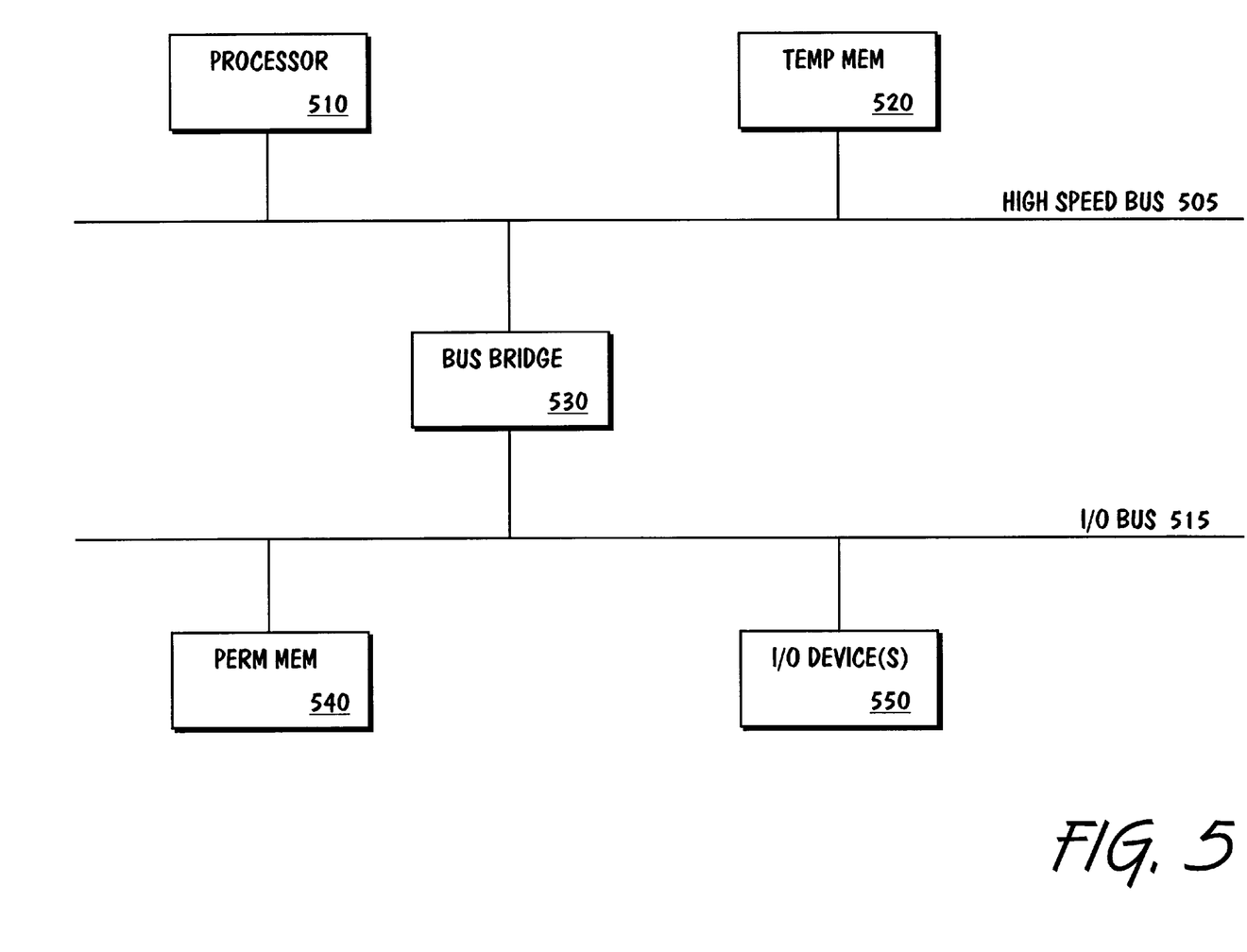
FIG. 5 illustrates one embodiment of a hardware system.

FIG. 5 illustrates one embodiment of a hardware system intended to represent a broad category of computer systems such as personal computers, workstations, and/or embedded systems. In the illustrated embodiment, the hardware system includes processor 510 coupled to high speed bus 505, which is coupled to input/output (I/O) bus 515 through bus bridge 530. Temporary memory 520 is coupled to bus 505. Permanent memory 540 is coupled to bus 515. I/O device(s) 550 is also coupled to bus 515. I/O device(s) 550 may include a display device, a keyboard, one or more external network interfaces, etc.

Certain embodiments may include additional components, may not require all of the above components, or may combine one or more components. For instance, temporary memory 520 may be on-chip with processor 510. Alternately, permanent memory 540 may be eliminated and temporary memory 520 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, is implemented using one or more computers such as the hardware system of FIG. 5. Where more than one computer is used, the systems can be coupled to communicate over an external network, such as a local area network (LAN), an IP network, etc. In one embodiment, the present invention is implemented as software routines executed by one or more execution units within the computer(s). For a given computer, the software routines can be stored on a storage device, such as permanent memory 540.

Figure 6:
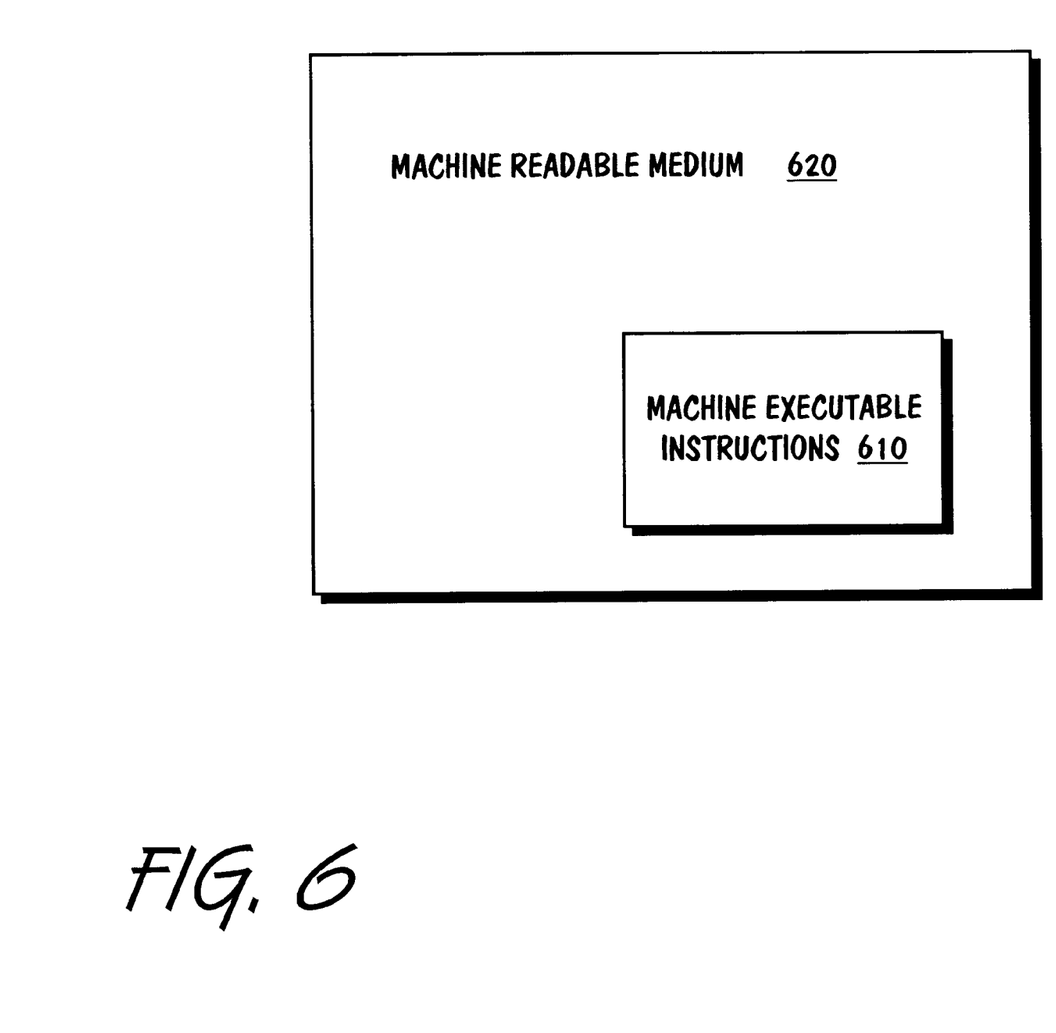
FIG. 6 illustrates one embodiment of a machine readable storage medium.

Alternately, as shown in FIG. 6, the software routines can be machine executable instructions 610 stored using any machine readable storage medium 620, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device 550 of FIG. 5.

From whatever source, the instructions may be copied from the storage device into temporary memory 520 and then accessed and executed by processor 510. In one implementation, these software routines are written in the C programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with one or more of the above described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, a method and apparatus for determining an extent to which an electronic device has been operated is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
   interpreting an extent to which an electronic device has been operated as recorded by a recording unit in the electronic device;
   coupling the electronic device to a tester;
   downloading data recorded by the recording unit to the tester;
   identifying with the tester a level of operation among a plurality of possible levels of operation; and
   sorting by a sorting device the electronic device based on the level of operation.

2. The method claim 1 wherein the electronic device is one of a plurality of electronic devices having incorporated recording units.

3. The method of claim 2 wherein sorting the plurality of electronic devices comprises sorting the plurality of electronic devices into devices eligible for re-sale and devices not eligible for resale.

4. The method of claim 3 wherein each recording unit comprises a plurality of registers corresponding to a plurality of levels of operation of each electronic device, the method further comprising:
   re-setting the plurality of registers in the devices eligible for re-sale.

5. The method of claim 2 wherein sorting the plurality of electronic devices comprises sorting the plurality of electronic devices into devices that have been used for their intended purpose and devices that have not been used for their intended purpose.

6. An apparatus comprising:
   a testing device to interpret an extent to which an electronic device has been operated as recorded by a recording unit in the electronic device by accessing the recording unit to retrieve data indicating the extent to which the electronic device has been operated, wherein the testing device comprises: a memory reader; and a coupling device to couple the memory reader to the electronic device, the memory reader to download data recorded by the recording unit from a memory in the electronic device, the data to identify a level of operation among a plurality of possible levels of operation for the electronic device, wherein the testing device is external to the electronic device being tested; and
   a sorting device to sort based on the level of operation.

7. The apparatus of claim 6 wherein the electronic device is one of a plurality of electronic devices having incorporated recording units, wherein the sorting device sorts the plurality of electronic devices based on the extent to which the plurality of electronic devices have been operated as recorded by the recording units.

8. The apparatus of claim 7 wherein the sorting device sorts the plurality of electronic devices into devices that have been used for their intended purpose and devices that have not been used for their intended purpose.

* * * * *